May 18, 1937.  H. KOTT  2,081,041
APPARATUS FOR MEASURING RADIATION
Filed Aug. 23, 1934  2 Sheets-Sheet 2
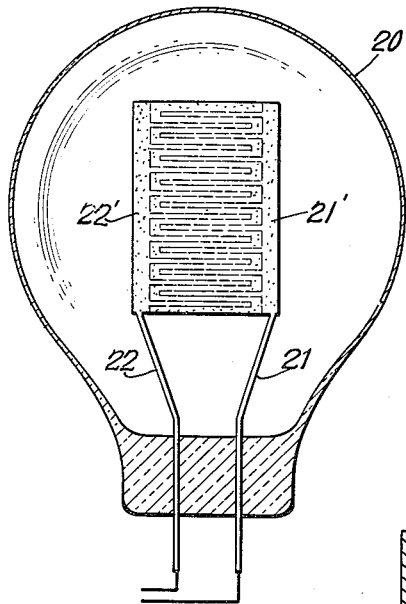
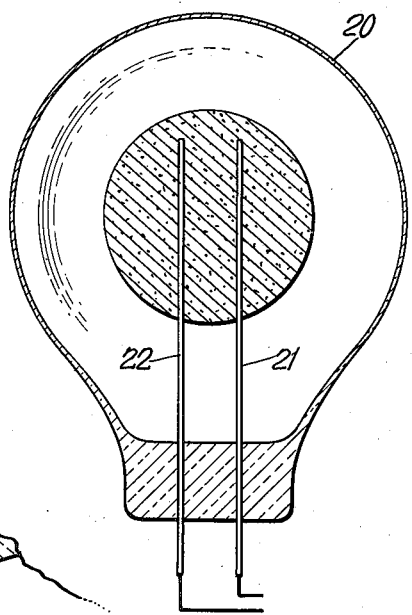
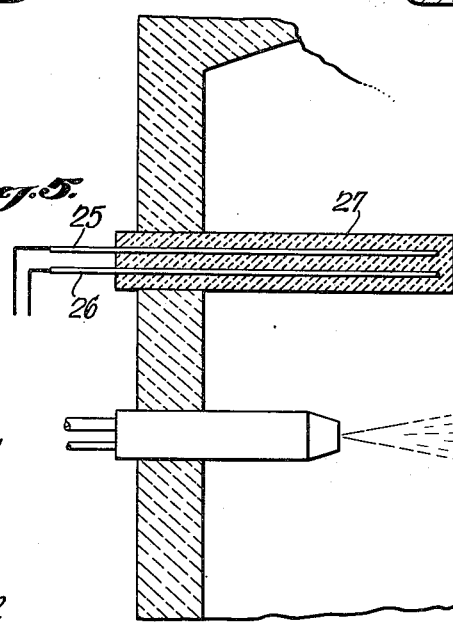
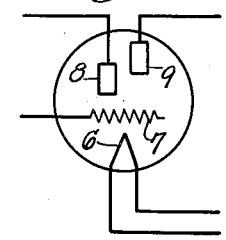
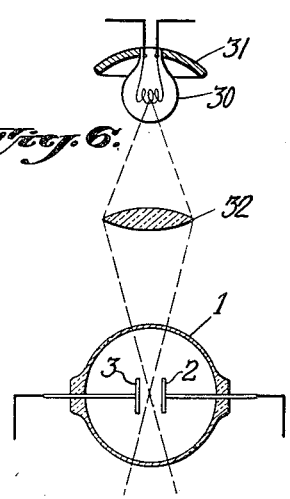
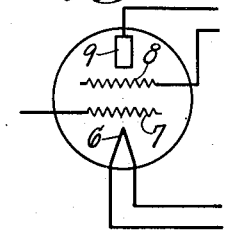
INVENTOR.
HERMANN KOTT.
BY
ATTORNEYS Patented May 18, 1937

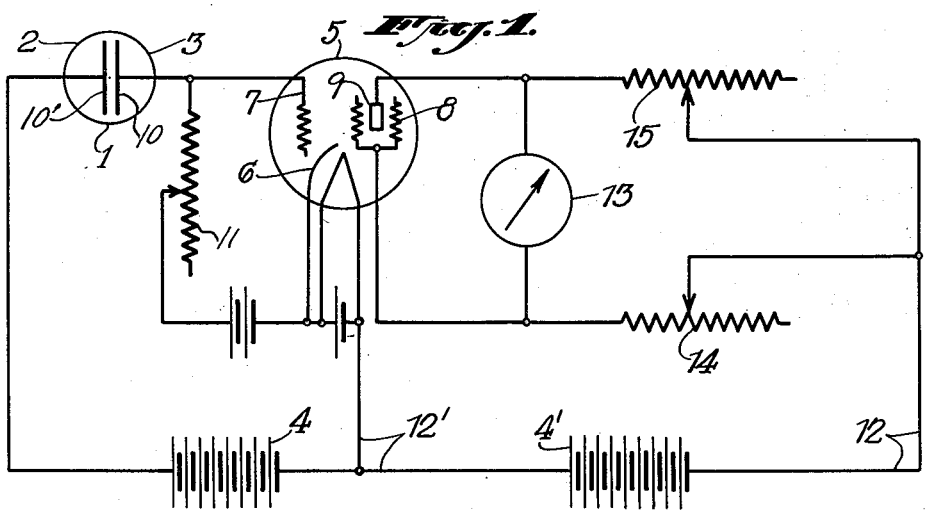
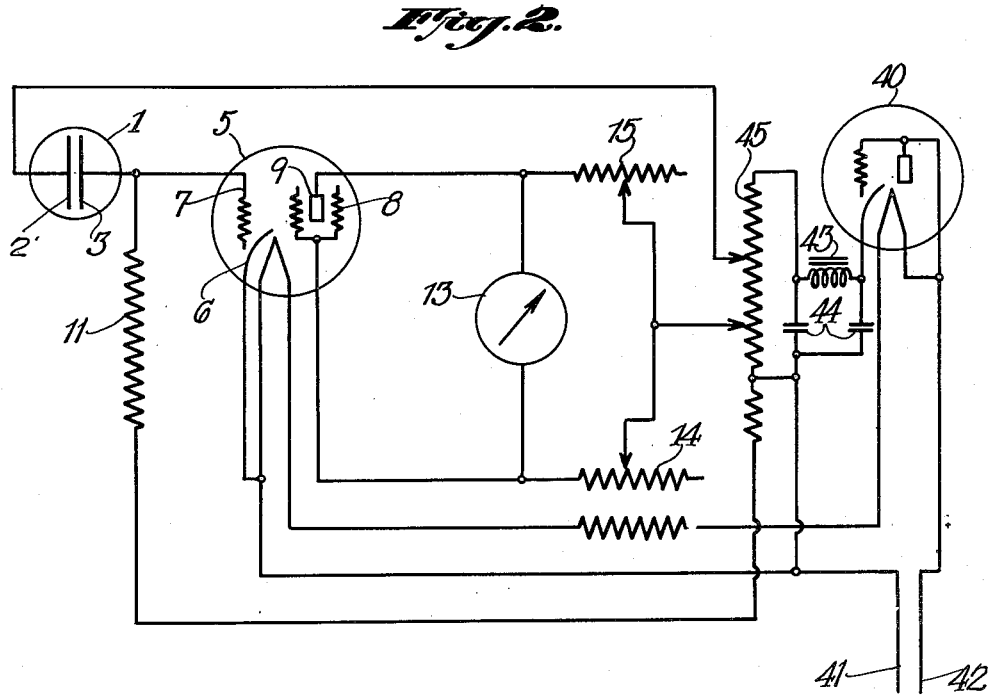

2,081,041

UNITED STATES PATENT OFFICE 2,081,041

APPARATUS FOR MEASURING RADIATION

Hermann Kott, New York, N. Y., assignor, by mesne assignments, to Ion Corporation, Short Hills, N. J., a corporation of New Jersey Application August 23, 1934, Serial No. 741,123

3 Claims. (Cl. 250—34)

This invention relates to electrical apparatus and more particularly to electrical apparatus of the type adapted to measure, detect and indicate radiation such as heat, light, ultra-violet, X-radiation, cathode radiation and the like. In the measurement of radiation it is frequently essential that the device provided be capable of detecting a single type of radiation or a single range of radiation. It is also frequently essential that the intensity of such radiation be ascertained. This is particularly true of devices for detecting and measuring ultra-violet radiation, X-ray radiation and cathode-ray radiation. The devices heretofore provided in the art are not generally adapted to either restrict the radiation to a limited range of wave lengths or to measure the quantity of radiation to which it is exposed. Moreover, such devices have heretofore failed to accurately indicate such radiation.

One of the objects of the present invention is to provide a simple and convenient apparatus for the measurement of all types of radiation and to obtain a direct measurement of the quantity of such radiation. Another object of the present invention is to improve the detection, recording and measurement of radiation of all wave lengths. Still another object of the present invention is to provide means for accomplishing the above objects. Other objects and advantages become apparent as the invention is more fully disclosed.

In accordance with the above objects I have discovered that the energy of radiation may be utilized to vary the electrical conductivity of a relatively high electrical resistance path and that by impressing this varying current upon the grid electrode of a thermionic amplifier device, the plate current of said device may be accordingly varied. This varying plate current then may be utilized to actuate mechanism controlling the generation of said radiation or may be applied to devices indicating, or measuring, or recording the same.

I have further found that variations in the thus modified plate current which may be incident to variations in the electrical characteristics of the electrical circuit associated therewith may be substantially eliminated by modifying the structure of the usual type of thermionic amplifier device. I provide the device with a pair of anodes one of which is in relatively closer spaced relationship to the usual grid and cathode electrodes provided therein, than is the other of said anodes. Thereafter by electrically connecting the two anodes in parallel to a common terminal and by providing a variable resistance element in each anode circuit, I may through a suitable adjustment of each of said resistances, equalize the current flow through each anode circuit. A galvanometer electrically connected across the said anode circuits will indicate the difference in the plate currents of said anode circuits at any given anode and grid potentials. Thereafter as the plate current is varied by reason of variations in the grid potential, the anode circuit including the anode electrode in closer spaced relation to the cathode, will fluctuate. The galvanometer will indicate such fluctuation.

This arrangement of elements provides for the direct recording of variations in the electric current passing through the high resistance path. By adapting the high resistance path to be sensitive to radiation of a single wave length or a restricted band of wave lengths a direct reading of the quantity of said radiation may be thereby obtained.

I have discovered, for example, that in the measurement of heat radiation that I may embed a pair of conductors in spaced relation in a material heretofore identified in the art as being an electrical non-conductor and that by impressing an electrical potential of opposite polarity on each of said electrodes of such an intensity as to yield a measurable leakage current at atmospheric temperatures that when the electrical conductivity of the said refractory insulator is altered by changes in temperature that the leakage currents passing therethrough from one electrode to the other vary accordingly. This variation in leakage current then may be utilized to modify and vary the plate current of a thermionic amplifier device, particularly of the double anode type hereinabove described, by impressing said current upon the grid electrode of said thermionic amplifier device.

I have also found that when a pair of electrodes are disposed in spaced relation within a hermetically sealed envelop permeable to radiation or a preferred band of radiation, and that when a pressure of gas is inserted in said envelop at pressures ranging from above a substantial vacuum to pressures greater than atmospheric, that on the application of an electrical potential across said electrodes substantially below that promoting a gaseous conduction discharge thereacross, and by suitably adjusting the external resistance of the circuit to the internal resistance of the said device that a leakage current between said electrodes along the high resistance path of the gaseous filling may be obtained.

This leakage current when impressed upon the grid electrode of the above identified thermionic amplifier device may be utilized to modify the plate current therein. I have found that the electrical conductivity of the high resistance gas path between the electrodes may be varied by subjecting the gas to the action of radiation. With heat radiation, for example, the electrical conductivity of the gas path will increase directly with increase in the temperature of the gas. By properly adjusting the voltage across the electrodes, the gas composition and the gas pressure, as well as electrode spacing, the device may be rendered effective in detecting heat radiation over a wide range of temperatures through the mere variance in the leakage currents flowing from one electrode to the other.

By projecting radiation of other wave lengths such as ultra-violet radiation, X-radiation, etc., substantially the same effect may be produced. The electrode voltages, gas composition, gas pressures as well as electrode spacing of the device, however, must be modified in accordance with the specific radiation projected therethrough in order to obtain the direct measurement of the energy of the said radiation in terms of electrical conductivity along said high resistance gas path.

I have found that in general as the wave length of the radiation decreases that the electrical resistance of the high resistance path should be increased. This is illustrated by the fact that I have found that in the detection and measurement of X-radiation that in place of a gaseous atmosphere of one or more of the mon-atomic gases, it is preferable to employ a gas or a material which heretofore in the art, has been considered as an extremely high dielectric insulator and that by passing the X-radiation therethrough, I may markedly change the electrical conductivity of the same. Such a dielectric gas or material, for example, may be comprised of air or of sulphur.

As a specific embodiment of the practice of the present invention, I will disclose the same as it has been adapted to the measurement of X-radiation and to the measurement of light and heat radiation.

In this connection reference should be made to the accompanying drawings wherein:—

Fig. 1 illustrates the several elements of the present invention as it has been adapted to be used with direct electric current; Fig. 2 schematically illustrates the several elements as it has been adapted to be used with alternating electric currents; Figs. 3 and 4 illustrate modifications of one of the elements of the present invention adapting the same for specific use in detecting X-radiation; Fig. 5 illustrates the modification of one of the elements adapting the same to be used in the detection and measurement of heat radiation; Fig. 6 illustrates the manner of detecting light projecting radiation in accordance with the present invention; and Figs. 7 and 8 schematically illustrate the modifications permissible in the thermionic amplifier device of the present invention.

Referring to the drawings, Fig. 1, the several elements of the present invention may be noted in schematic detail. I provide a path of relatively high electrical resistance by disposing a pair of electrodes 2 and 3 in spaced relationship within the radiation permeable housing 1 containing a gaseous atmosphere having a composition and a pressure adapting the same to form a high resistance gas path between said electrodes. In the detection of X-radiation the gas pressure within the envelop is preferably relatively high approaching one atmosphere. And the gas composition preferably comprises dry air. The electrode spacing preferably approximates 0.5 centimeter. I then apply across said electrodes a potential at least sufficient to give at ordinary temperatures and in the absence of X-radiation, a measurable leakage current between said electrodes. To obtain this leakage current it is necessary to balance out the internal resistance of the device with the external resistance 11 in series through conductor 10 to one terminal of direct current source 4, the other terminal 10' being connected from said source to the opposite electrode 2 of the said device. The leakage current flow thus obtained is impressed upon grid electrode 7 of thermionic amplifier device 5.

In accordance with the present invention I provide thermionic amplifier device 5 with a pair of anodes 8 and 9 in addition to the thermionically active cathode 6. Anode 8 is disposed in relatively closer spaced relationship to grid 7 and cathode 6 than is anode 9. The pair of anodes 8 and 9 are electrically connected in parallel through variable resistances 14 and 15 to conductors 12 back to a source of electric positive potential 4'. The opposite side of said source 4' is electrically connected in the customary manner to conductors 12' to the negative side of cathode 6.

In this arrangement of elements it may be noted that upon the energization of the thermionically active cathode 6 a plate current will flow from cathode 6 to anodes 8 and 9. Anode 8 being closer spaced to the said cathode than anode 9 will receive the bulk of the said plate current where the electrical resistance of this anode circuit is the same or less than the electrical resistance of the anode circuit including plate 9. By increasing the electrical resistance of anode circuit 8 proportionately to that of anode circuit 9 the two anode circuits may be adjusted to receive substantially identical plate currents as may be ascertained by electrically connecting galvanometer or ammeter 13 in such a way as to detect the drop in potential between said circuits. When the two anode circuits are drawing an equal amount of plate current the galvanometer 13 will register zero. When either one or the other draws a larger amount of plate current the galvanometer will be deflected in one direction or the other.

With the circuit adjusted so that equal plate currents are being drawn by the anodes 8 and 9 at any given grid current applied on grid 7 it may be seen that by varying this grid current the plate current flowing to the closer spaced anode 8 will be varied. This variation in the grid current on grid 7 is obtained in accordance with the practice in the present invention by subjecting the high resistance gas path between electrodes 2 and 3 of the electrical resistance device to the influence of radiation. In the present specific embodiment X-radiation is projected through the gas enclosed within the envelop 1 preferably in a directional path between the electrodes 2 and 3 whereupon the electrical conductivity of the high resistance path will be increased proportionately to the amount of X-radiation projected therethrough and the intensity or wave length of the same. X-radiation is recognized in the art as being comprised of radiation of wave lengths lying below approximately $6.6 \times 10^{-6}$ cm.

Angstrom units to 0.005 x 10⁻⁶ cm. Angstrom units. By the provision of suitable filters between the source of X-radiation and the gas through which it is passed any desired wave length or restricted range of wave lengths may be projected therethrough. So also by suitable adjustment of the gas pressure and gas composition various degrees of reaction of the gas to the passage of said radiation may be obtained. By varying also the spaced relationship of electrodes 2 and 3 the sensitivity of the device may thereby be varied.

In Fig. 4 I have disclosed a modification of the electrical resistance element hereinabove disclosed which I have found to be admirably suited for the detection and measurement of X-radiation. The electrical resistance element of Fig. 4 comprises an enclosing envelope 20 permeable to X-radiation having a pair of electrodes 21 and 22 thermionically sealed therethrough. Instead of a high resistance gas path between electrodes 21 and 22, the spaced ends of said electrodes 21 and 22 are embedded in a mass of sulphur preferably melted together with a coherent mass. Upon the projection of X-radiation into and through the mass of sulphur the electrical conductivity of the sulphur will vary directly with the intensity of the radiation and with the wave length thereof, in substantially the same manner as does the gas path. Another modification of the resistance element is illustrated in Fig. 3. In this modification the electrodes 21 and 22 are enclosed in a radiation permeable envelop 20 and the ends of said electrodes terminate internally in grid electrodes 21'—22', disposed upon the surface of a dielectric insulating base element over the spaced arms of said grid electrodes 21' and 22' and bridging the space gap therebetween is a coating of dielectric insulating material of relatively high electrical resistance. I have found that the dielectric insulator may be comprised of dry air at temperatures approximating atmospheric or that I may employ a coating of sulphur over said grid elements with or without an evacuation of the enclosing envelop 20.

From the above description of the first specific embodiment of the present invention it is believed clear that contrary to prior art practice I aim to provide between electrodes 2 and 3 of the electrical resistance element of the present invention, an electrically conductive path of relatively low order obtaining thereby by means of a suitable balanced external electric circuit a flow of electric current recognized in the art as being a leakage current. Thereafter I subject the high resistance path to the effect of radiation thereby modifying the electrical conductivity of said path with consequent modification or variation in the leakage currents traversing the same. By impressing these leakage currents upon the modified thermionic amplifier device of the present invention, I am enabled through the associated electrical circuit therewith to detect and measure the same or to apply these currents to other advantageous uses.

In the adaption of this broad idea to the measurement of heat radiation reference should be made to Fig. 5 wherein I have disclosed a suitable type of electrical resistance element adapted to be inserted in the circuit of Fig. 1 for the detection of and measurement of heat energy. In the modification of Fig. 5, I embed electrical conductors 25 and 26 in refractory dielectric insulating material 27 such as those materials recognized as being conductors of the second class. An electrical potential is applied across electrodes 25 and 26 in a manner analogous to that heretofore described in Fig. 1, the potential being at least sufficient to obtain a measurable and small leakage current thereacross. Upon the application of heat energy to refractory material 27, the electrical resistance of the refractory material will be found to vary with the increase in temperature of the material 27. This variation is directly recorded as leakage current between the electrodes 25 and 26 and when impressed upon grid electrode 7 in the circuit described in Fig. 1, may thereby be detected and measured.

In Fig. 6, I have disclosed a manner in which radiation is projected into and through the electrical resistance element illustrated and hereinabove described in respect to Fig. 1. In Fig. 6 the radiation from source 30 is projected by means 31 through concentrating lens 32 and focused thereby through the enclosing envelop 1 of the electrical resistance element, passing into the gaseous filling and between the spaced electrodes 2 and 3 contained within the envelop. The precise phenomena occasioning the alteration of the electrical resistance of the gas path between said spaced electrodes is not thoroughly understood. It does not appear to be dependent upon the photo-sensitivity of the surfaces of electrodes 2 and 3 although by rendering said surfaces photo-sensitive the sensitivity of the device is markedly increased. This increase in sensitivity, however, is not desired in the detection and measurement of radiation, inasmuch as when the surfaces are photo-sensitive under the influence of the radiation the normal leakage currents traversing the high resistance gas path between said electrodes is augmented by electrons passing from the photo-sensitive material of the surface. It is preferable therefore to comprise electrodes 2 and 3 of material which is substantially inactive photo-electrically with respect to the specific radiation which is to be detected and projected with the resistance element device. In general I have found that iron and nickel, and alloys thereof, with the more common metals are the most suitable material for these electrodes, as such materials are relatively of a low order of photo-sensitivity.

In the adaption of the present invention in the measurement of light radiation or ultra-violet radiation, I omit the air atmosphere of the electrical resistance element heretofore described in the specific embodiment of apparatus suitable for the measuring of X-radiation and substitute therefor one or more of the rare gases argon, neon, helium, the precise gas pressure thereof being dependent upon the type or wave length of radiation to be detected as well as the particular electrode spacing employed. In general a gas pressure of neon at about 15 millimeters of mercury pressure and an electrode spacing of about 3 millimeters will yield an electrical resistance path which is variable by the projection of light radiation therethrough. For the detection of ultra-violet radiation substantially the same type of device as useful in the projection of light radiation may be employed. However, higher gas pressures than permissible in the detection of light radiation may be utilized. In the detection of ultra-violet radiation the electrode surfaces should be substantially free from those metals and elements known in the art as being photo-sensitive to this type of radiation. In the detection of light radiation the electrode surfaces should be substantially free from the alkaline earth metals which are sensitive to such radiation.

In Figs. 7 and 8, I have illustrated schematically two contemplated modified structures of a thermionic amplifier device suitable for the purposes of the present invention. In Fig. 1, I have indicated that anode 8 is what is identified in the art as a grid structure surrounding and enclosing anode 9. This structure insures the preferential passing of the plate current to anode 8. In Fig. 7, however, the anodes 8 and 9 are indicated schematically in their relative spaced relationship to the grid and cathode elements of the thermionic amplifier device. The precise spacing is immaterial as long as one anode is closer spaced to the grid and cathode than the other anode. The more remote anode 9 is from the grid and cathode elements merely increases the resistance necessary to include in anode circuit 8 to balance out the two circuits. As an alternative structure anode 8 may be comprised of a grid similar to grid 7 but interposed between plate anode 9 and grid 7 with the grid 7 interposed between anode 8 and cathode 6. Anode 8 although in this structure resembling a grid is not a grid as ordinarily understood in the art, but is a grid-type or perforated anode.

Referring to Fig. 2 the necessary modifications of the electric circuit heretofore disclosed with respect to Fig. 1 are indicated when it is desired to adapt the present invention to operation upon alternating electric current. The modification requires the substitution of an alternating current rectifier means for the battery source of direct current indicated in Fig. 1. This means is indicated in Fig. 2 and includes a thermionic rectifier 40 electrically connected to terminals 41—42 of alternating current source. By means of choke 43 and condensers 44, the direct current output of rectifier 40 is passed through resistance 45 from which at appropriate points the potentials necessary for the circuit may be obtained. The balance of the circuit is substantially as heretofore described in Fig. 1.

From the above description and drawings it may be noted that the present invention may be widely modified to adapt the same to a plurality of analogous uses without departure, and all such modifications are contemplated as may fall within the scope of the following claims.

What I claim is:—

1. In combination, apparatus for detecting and measuring radiation including a high resistance path for electric current, the electrical conductivity of said path being variable by said radiation, means to pass a measurable leakage current along said path, a thermionic amplifier device including an electron emitting cathode, a grid electrode and a pair of anodes one of said anodes being closer spaced to said cathode and grid than the other of said anodes, an electrical circuit including a source of potential electrically connecting said cathode and said anodes to produce a plate current therebetween, means to equalize the plate current between said anodes, means to subject said resistance path to the influence of said radiation, and means to detect and measure the extent of variation in said plate current incident to variation in the leakage current impressed upon said grid electrode.

2. An electrical circuit for detecting variations of relatively low order in an electric current, said circuit including a thermionic amplifier device having grid and cathode electrodes and a pair of anodes one of which is closer spaced to said grid and cathode than the other, means to pass a plate current between said cathode and anodes, means to equalize the plate current drawn by each anode and means to detect a variation in the plate current drawn by said closer spaced anode upon a variation in the potential applied to said grid electrode.

3. An electrical circuit for detecting variations of relatively low order in an electric current, said circuit including a thermionic amplifier device provided with grid and cathode electrodes and a pair of anodes one of which is closer spaced to said grid and cathode than the other and means to adjust the plate current equally between said anodes at any given grid potential, means to impress the said variable electric current upon said grid electrode, and means for indicating the difference in potential between said anodes incident to variations in said variable current impressed on said grid.

HERMANN KOTT.